United States Patent
Kang et al.

(10) Patent No.: US 10,091,657 B2
(45) Date of Patent: Oct. 2, 2018

(54) METHOD FOR DETERMINING VALIDITY OF BASE STATION AND ELECTRONIC DEVICE SUPPORTING THE SAME

(71) Applicant: Samsung Electronics Co., Ltd., Gyeonggi-do (KR)

(72) Inventors: Dae Jun Kang, Seoul (KR); Hee Seok Ko, Seoul (KR); In Hoe Koo, Gyeonggi-do (KR); Chan Soo Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/496,211

(22) Filed: Apr. 25, 2017

(65) Prior Publication Data
US 2017/0311165 A1 Oct. 26, 2017

(30) Foreign Application Priority Data
Apr. 25, 2016 (KR) ........................ 10-2016-0050039

(51) Int. Cl.
*H04M 1/66* (2006.01)
*H04W 12/12* (2009.01)
*H04W 48/10* (2009.01)
*H04W 12/06* (2009.01)
*H04W 88/08* (2009.01)

(52) U.S. Cl.
CPC ........... *H04W 12/12* (2013.01); *H04W 48/10* (2013.01); *H04W 12/06* (2013.01); *H04W 88/08* (2013.01)

(58) Field of Classification Search
CPC ..... H04W 12/12; H04W 88/08; H04W 64/00; H04W 12/06; H04W 84/12; H04W 64/003; H04W 8/005; H04W 28/08; H04W 36/0061; H04W 48/08; H04W 88/02; H04W 88/06; H04W 4/027; H04W 4/028; H04W 72/0493; H04W 84/005; H04W 36/08; H04W 40/22; H04W 76/02; H04W 88/16; H04W 8/26; H04W 72/02; H04W 36/0016; H04W 36/14; H04W 36/0038; H04W 48/18; H04W 48/20; H04B 7/02
See application file for complete search history.

(56) References Cited

U.S. PATENT DOCUMENTS

| | | | | |
|---|---|---|---|---|
| 2006/0153153 A1* | 7/2006 | Bhagwat | .................. | H04K 3/65 370/338 |
| 2007/0064647 A1* | 3/2007 | Prasad | ................ | H04L 63/0869 370/331 |
| 2007/0186276 A1* | 8/2007 | McRae | ............... | H04L 63/1408 726/4 |
| 2008/0301773 A1* | 12/2008 | Achtari | ................... | G06F 15/16 726/3 |
| 2012/0134272 A1* | 5/2012 | Vempati | .................. | H04L 43/10 370/241 |
| 2013/0165077 A1 | 6/2013 | Aalla et al. | | |

(Continued)

*Primary Examiner* — Nimesh Patel
(74) *Attorney, Agent, or Firm* — Cha & Reiter, LLC

(57) ABSTRACT

A disclosed electronic device includes a processor, a memory, and a communication circuit that receives system information about at least one cell of a communication network from a base station. The processor is configured to determine whether the base station is a valid component of the communication network based on one or more cell allocation values included in the system information.

12 Claims, 5 Drawing Sheets

(56) References Cited

U.S. PATENT DOCUMENTS

| | | | |
|---|---|---|---|
| 2014/0304770 A1* | 10/2014 | Jung | H04W 12/12 |
| | | | 726/2 |
| 2015/0140997 A1* | 5/2015 | Goldfarb | H04W 8/02 |
| | | | 455/424 |
| 2016/0212623 A1* | 7/2016 | Cote | H04W 12/12 |

* cited by examiner

METHOD FOR DETERMINING VALIDITY OF BASE STATION AND ELECTRONIC DEVICE SUPPORTING THE SAME

CLAIM OF PRIORITY

This application claims the benefit under 35 U.S.C. § 119(a) of a Korean patent application filed on Apr. 25, 2016 in the Korean Intellectual Property Office and assigned Serial number 10-2016-0050039, the entire disclosure of which is hereby incorporated by reference.

TECHNICAL FIELD

The present disclosure relates to a technology for operating a mobile communication service between an electronic device and one or more base stations.

BACKGROUND

To execute a communication service function, an electronic device with a mobile communication function, such as a mobile phone, needs to connect with a base station system. One of the functions of the base station system is to relay a signal to be transmitted to the electronic device or a signal received from the electronic device, when the base station is properly accessed by the electronic device. A network provider may build a communication network by providing a multitude of these base stations, each base station having an area of a specified range that overlaps with another range of another base station. In the art, the coverage area of a base station is also known as a cell. The electronic device may connect with the cell by performing a series of authentication procedures together with the base station system based on unique security information.

Since the base station system retains information about the electronic device, which connects to the cell, security is required to keep the retained information secure and confidential. Recently, information about the electronic device or a user of the electronic device has been hacked. Malicious hackers obtain the information by setting up a fake base station disguised as a valid base station by duplicating the information necessary to identify the base station. Since the hacked information may be used illegally, serious harm may be caused. Accordingly, a countermeasure is needed to prevent this type of hacking.

SUMMARY

Aspects of the present disclosure are to address at least the above-mentioned problems and/or disadvantages and to provide at least the advantages described below. Accordingly, an aspect of the present disclosure is to provide a method for determining validity of a base station that is capable of preventing security incidents by determining validity of the base station and reliably connecting with the base station cell, and an electronic device supporting the same.

In accordance with an aspect of the present disclosure, an electronic device includes a processor, a memory, and a communication circuit that receives system information about at least one cell of a communication network from a base station. The processor is configured to determine whether the base station is a valid component of the communication network based on one or more cell allocation values included in the system information.

In accordance with another aspect of the present disclosure, a base station validity determining method of an electronic device includes receiving system information about at least one cell of a communication network from a base station and determining whether the base station is a valid component of the communication network based on one or more cell allocation values included in the system information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
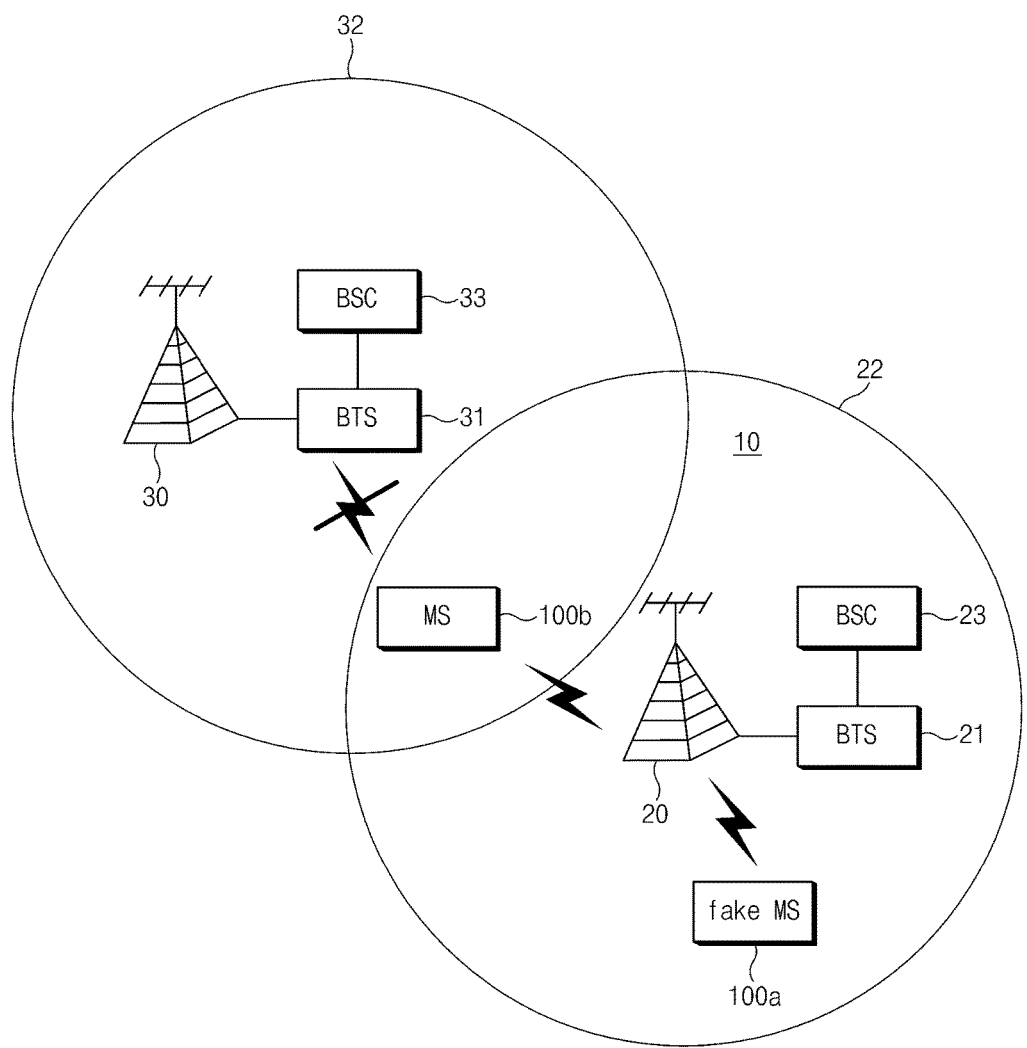
FIG. 1 is a view illustrating an example of a fake base station operation in a base station system environment.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a view illustrating an example of a fake base station operation in a base station system environment.

Referring to FIG. 1, a base station system 10 may include a base station 20, a base transceiver station (BTS) 21, and a base station controller (BSC) 23.

The base station 20 may form a cell 22 of a specified range based on a specified frequency band and may provide a mobile communication service in the area of the cell 22. For example, the base station 20 may perform an interface role (or a relay role) between a specified mobile device that comes with the cell 22 and a switching center and may provide a mobile communication service such as transmission of an incoming/outgoing call signal, designation of a broadcast channel, detection of a broadcast channel, or the like.

The BTS 21 may transmit information to an electronic device 100a, which is in the cell 22 area of the base station 20, through a specified broadcast channel. For example, the BTS 21 may transmit, to the electronic device 100a, system information (SI) including at least one of cell allocation information, neighbor cell information, parameter information about cell selection/reselection, and frequency intensity information.

The electronic device 100a (e.g., a mobile station (MS) or an electronic device of a malicious hacker who uses the electronic device 100a to set up a fake base station) in the area of the cell 22 of the base station 20 may transmit system information received from the BTS 21 to a separate modem device (not illustrated). The modem device may disguise a separate fake base station (not illustrated) as the actual base station 20 by duplicating the transmitted system information. During this operation, the modem device may have to change at least a portion of the system information. For example, the modem device may change parameter information (e.g., a parameter value) about cell selection/reselection such that a user electronic device 100b (e.g. an electronic device of a legitimate user) connects to the fake base station because the fake base station is configured to have a higher priority than the real, valid base station.

In the case where the user electronic device 100b is located in a cell area of the fake base station, the modem device may transmit the system information of the fake base station, which again may be different from the system information of the real base station, to the user electronic device 100b through a specified broadcast channel. Information about a cell 32 of a neighbor base station 30 in a peripheral region may be included in the system information that the modem device transmits.

The user electronic device 100b may select a cell to be connected, by monitoring at least one information about the cell in the system information received from the modem device. In this regard, the user electronic device 100b may select a cell of a fake base station that has been disguised as a base station of a higher priority than the cell 32 of the neighbor base station 30, based on a change in parameter information about cell selection/reselection by the modem device. The user electronic device 100b may connect with the cell of the fake base station by performing a series of authentication processes with the fake base station.

The user electronic device 100b may be requested to transmit at least one information as a response to cell connection of the fake base station by the fake base station. For example, the user electronic device 100b may be requested to transmit at least one of Temporary Mobile Subscriber Identity (TMSI), International Mobile Station Identity (IMSI), International Mobile Equipment Identity (IMEI), and dial number to the fake base station. The fake base station may generate a spam message based on at least one of TMSI, IMSI, IMEI and dial number that are provided from the user electronic device 100b and may transmit the spam message to the user electronic device 100b.

As described above, the fake base station may prevent the user electronic device 100b from normal mobile communication operations by transmitting spam messages or the like to the user electronic device 100b. In addition, the fake base station may obtain and abuse security information of the user electronic device 100b or personal information of a user. To this end, according to an embodiment, an electronic device may determine validity of a base station (e.g. whether the base station is a valid component of the communication network) based on the system information about at least one cell received from the base station and may determine whether to connect with a base station (or a cell of the base station), based on the determination result.

Figure 2:
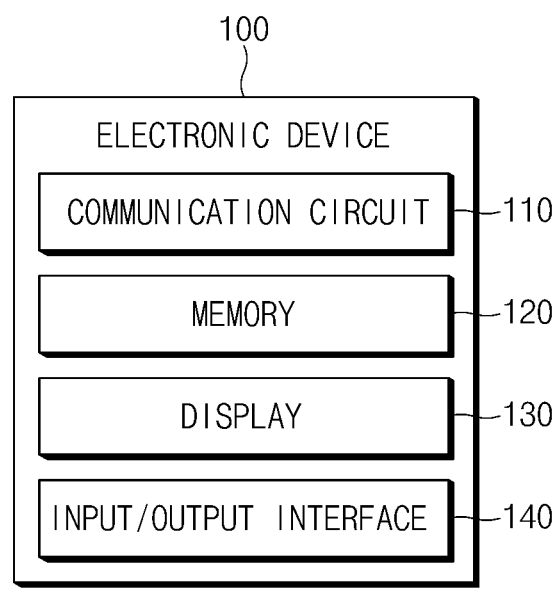
FIG. 2 is a view illustrating a configuration of an electronic device, according to an embodiment.

FIG. 2 is a view illustrating a configuration of an electronic device, according to an embodiment.

Referring to FIG. 2, an electronic device 100 may include a communication circuit 110, a memory 120, a display 130, and an input/output (I/O) interface 140. According to one embodiment, the electronic device 100 may omit at least one of the above-mentioned elements or may further include other elements. For example, the electronic device 100 may include an element of an electronic device 501 to be illustrated in FIG. 5. Alternatively, to implement an embodiment disclosed in the present disclosure, the electronic device 100 may include additional elements.

The communication circuit 110 may communicate with an external device (e.g., a BTS). For example, the communication circuit 110 may receive system information about at least one cell of the communication network from the external device (e.g., a BTS) by performing wireless communication. The communication circuit 110, which may include a processor, may extract cell allocation information included in the system information. The communication circuit 110 may determine whether the cell allocation value satisfies a specified condition, by analyzing the cell allocation value. For example, the communication circuit 110 may determine whether the cell allocation value satisfies a specified value (e.g., 0). In an embodiment, where all cell allocation values included in the system information satisfy the specified value, the communication circuit 110 may determine that the base station associated with the external device (e.g., a BTS) is an invalid fake base station.

In one embodiment, the communication circuit 110 may compare each of a parameter value for cell selection and a parameter value for cell reselection, which are included in the system information, with a specified threshold value. In the case where at least one of the parameter values for the cell selection and the cell reselection is not less than the threshold value, the communication circuit 110 may determine that the base station is fake. The communication circuit 110 may then store information about the base station (e.g., identification of the external device or BTS) into a database and may store the database in the memory 120.

In an embodiment, when it is determined that the external device transmitting the system information is related to an invalid base station, the communication circuit 110 may monitor neighbor cell information included in the system information. For example, the communication circuit 110 may select a cell, which is identified as being suitable for connection in the neighbor cell information, with reference to frequency intensity information or parameter information about cell selection. The communication circuit 110 may request a handover to the base station associated with the selected cell and may perform the handover.

In an embodiment, the communication circuit 110 may be included in at least one processor such as a communication processor (CP), may be included as a part of the processor, or may be implemented as a separate device. The communication circuit 110 may include a radio frequency (RF) circuit, for example, a Radio Frequency Integrated Chip (RFIC).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), or the like as a cellular communication protocol.

The memory 120 may store instructions or data associated with elements of the electronic device 100. The memory 120 may include a nonvolatile memory. The memory 120 may store a database of a fake base station including information about at least one base station (or information about a fake base station received from a valid base station) that is determined as being invalid.

The display 130 may output at least one screen interface associated with a mobile communication service operation of the electronic device 100. For example, the display 130 may output a notification screen interface when a fake base station is identified, a screen interface including information about the fake base station, or the like. In one embodiment, the screen interface output by the display 130 may include at least one content (e.g., a text, an image, a video, an icon, a symbol, or the like).

The I/O interface 140 may receive a user input of the electronic device 100 and may transmit the user input to another element of the electronic device 100. Furthermore, the I/O interface 140 may output an instruction or data, received from another element of the electronic device 100, to the user or the external device, for example via the display 130. In an embodiment, the I/O interface 140 may receive at least one user input associated with transmitting of information about the fake base station (or a database) to a valid base station and may transmit the at least one user input to the communication circuit 110.

According to various embodiments, an electronic device may include a processor, a memory, and a communication circuit that receives system information about at least one cell of a communication network from a base station. The processor may determine whether the base station is a valid component of the communication network based on one or more cell allocation values included in the system information.

According to various embodiments, the processor may determine the base station as an invalid fake base station, when the one or more cell allocation values satisfy a specified condition.

According to various embodiments, the processor may determine the base station as an invalid fake base station, when all cell allocation values included in the system information are '0'.

According to various embodiments, the processor may store information identifying the base station in a database in the memory, when the base station is determined as an invalid fake base station.

According to various embodiments, the processor may transmit the database to another base station that is determined as a valid component of the communication network.

According to various embodiments, the processor may determine whether system information about at least one cell of the communication network from another base station is same as information included in the database and may verify a cell allocation value of the system information from the other base station, when the system information from the other base station is not included in the database.

According to various embodiments, the processor may determine the validity of the base station further based on a parameter value for cell selection and a parameter value for cell reselection, which are included in the system information.

According to various embodiments, the processor may determine the base station as an invalid fake base station, when at least one of the parameter values is not less than a specified threshold value.

According to various embodiments, the processor may maintain connection with another base station that previously connected with the electronic device, when the base station is determined as invalid.

According to various embodiments, the processor may receive the system information about the at least one cell through a broadcasting channel (BCCH).

Figure 3:
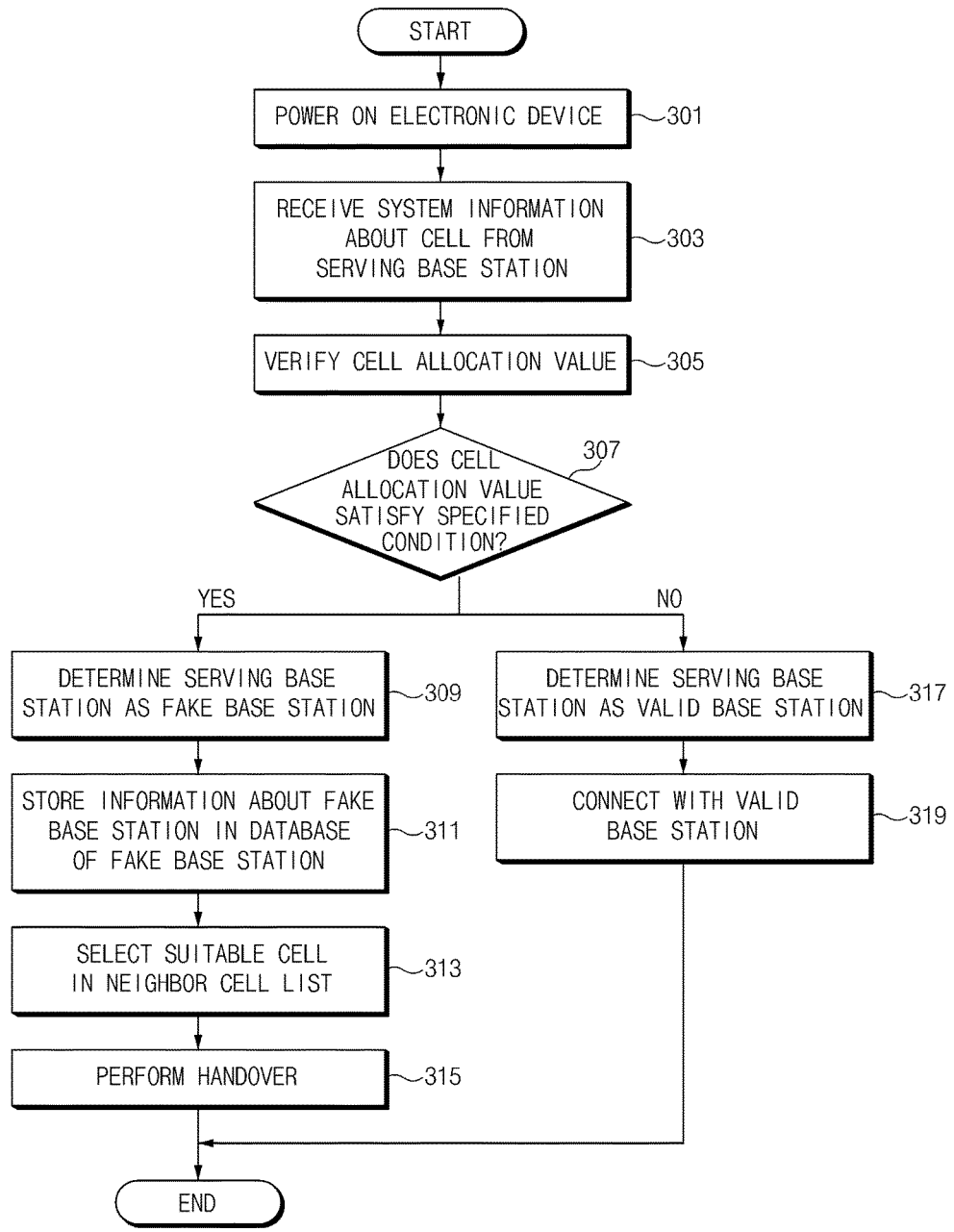
FIG. 3 is a flowchart illustrating a base station validity determining method of an electronic device, according to an embodiment.

FIG. 3 is a flowchart illustrating a base station validity determining method of an electronic device, according to an embodiment.

In operation 301, the electronic device 100 may be located in a cell area of a serving base station and may be powered on. In this case, once powered on, the communication circuit 110 of the electronic device 100 may enter an activation mode state that makes it possible to communicate with the serving base station.

In operation 303, the communication circuit 110 may receive system information about at least one cell from a BTS of the serving base station. Cell allocation information, neighbor cell information, parameter information about cell selection and reselection, and the like may be included in the system information.

In operation 305, the communication circuit 110 may extract at least one cell allocation information included in the system information to analyze a cell allocation value. In operation 307, the communication circuit 110 may determine whether the analyzed cell allocation value satisfies a specified condition. The specified condition may include the case where all cell allocation values included in the system information are '0'.

When the cell allocation value satisfies the specified condition (e.g., in the case where all cell allocation values are '0'), in operation 309, the communication circuit 110 may determine the serving base station, which transmitted the system information, is an invalid fake base station. The determination of the communication circuit 110 may be based on impossibility of frequency hopping because the fake base station is not capable of operating a plurality of cells. With regard to this operation, in one embodiment, after determining the serving base station as the fake base station, the communication circuit 110 may re-determine validity of the base station based on a parameter value for cell selection and a parameter value for cell reselection, which are included in the system information. For example, in the case where at least one of the parameter value for the cell selection and the parameter value for cell reselection is not less than a specified threshold value, the communication circuit 110 may definitely determine that the serving base station is the fake base station.

In operation 311, the communication circuit 110 may write information regarding the serving base station, which is determined as the fake base station, into a database (e.g., a database of a fake base station) and may store the database in memory. For example, Mobile Country Code (MCC), Mobile Network Code (MNC), Location Area Code (LAC), cell ID, Absolute Radio Frequency Channel Number (ARFCN), and the like may be included in the information of the serving base station to be included in the database. In this regard, in one embodiment, the communication circuit 110 may compare the system information about a cell, which will be received later from a separate base station, with information stored in the database and may analyze the comparison result. For example, the communication circuit 110 may determine whether received system information about the cell is the same as the information included in the database. If received system information about the cell is the same as the information included in the database, the communication circuit 110 may determine the separate base station is a fake base station. Furthermore, in one embodiment, in the case where the communication circuit 110 connects with a cell of a valid base station later, the communication circuit 110 may transmit information in the database regarding the discovered fake base stations to the valid base station.

On the basis of determining whether the serving base station is determined as the fake base station, in operation 313, the communication circuit 110 may monitor neighbor cell information included in the system information. In this operation, the communication circuit 110 may select a cell, which is determined to be suitable for connection, in a neighbor cell list included in the neighbor cell information based on, for example, frequency intensity, a parameter value of cell selection, or the like.

On the basis of the selection of at least one of neighbor cells, in operation 315, the communication circuit 110 may request a handover to a base station corresponding to the selected cell and may perform a handover through a series of processes.

In operation 307, when a cell allocation value does not satisfy a specified condition (e.g., in the case where at least one cell allocation values is not '0'), the operation continues to operation 317. In operation 317, the communication circuit 110 may determine the serving base station transmitting the system information as a valid base station. Accordingly, in operation 319, the communication circuit 110 may connect to the base station that is determined as being valid.

Figure 4:
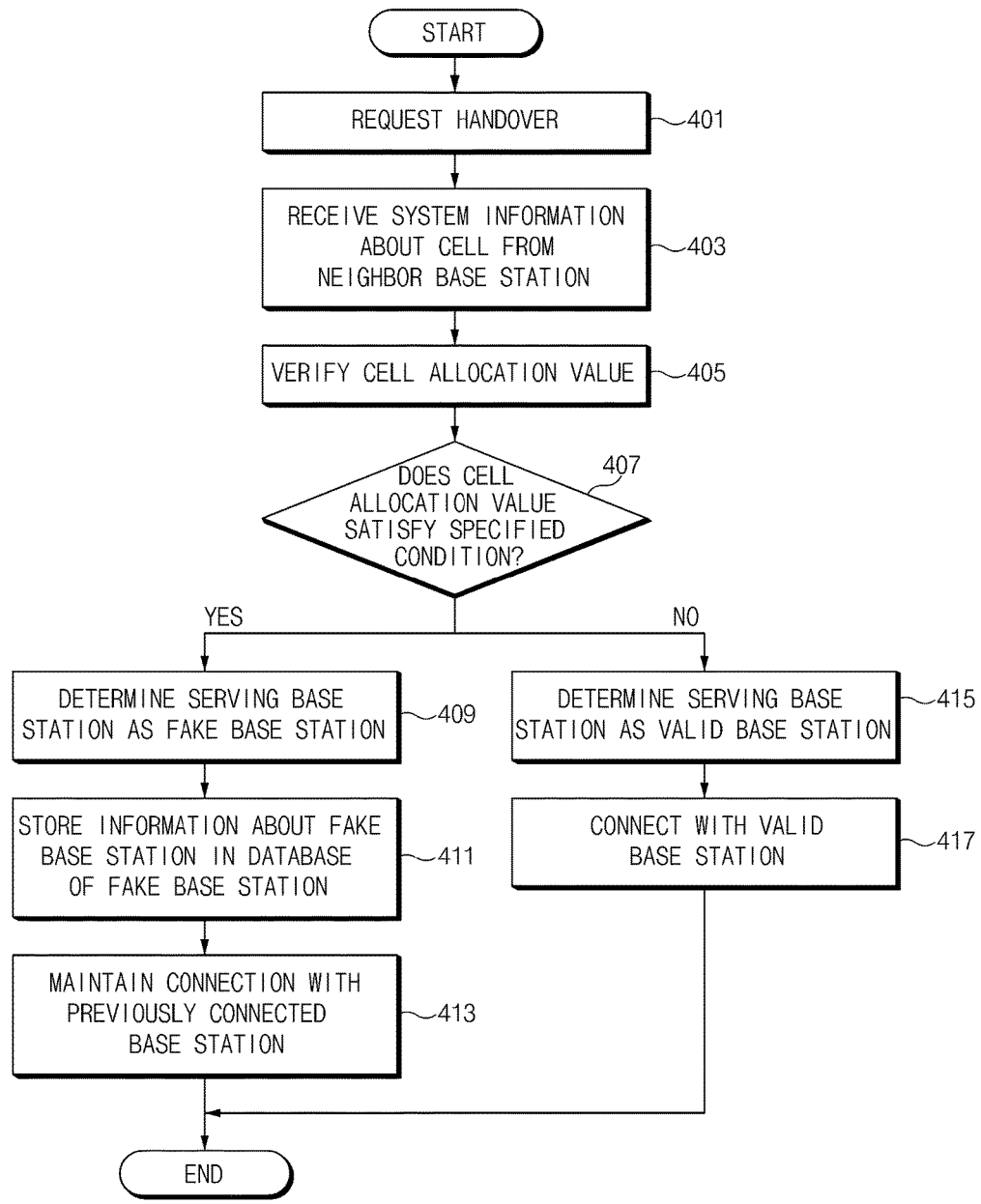
FIG. 4 is a flowchart illustrating a base station validity determining method of an electronic device, according to another embodiment.

FIG. 4 is a flowchart illustrating a base station validity determining method of an electronic device, according to another embodiment.

In operation 401, the electronic device 100 may request a handover. For example, in a state where the electronic device 100 connects with a serving base station, the electronic device 100 may request registration from a neighbor cell. As such, in operation 403, the communication circuit 110 may receive system information about a cell from a neighbor base station that requests the handover.

In FIG. 4, operation 405, operation 407, operation 409, and operation 411 after operation 403 may be the same as or correspond to operation 305, operation 307, operation 309, and operation 311 in FIG. 3. Accordingly, detailed descriptions of operation 405, operation 407, operation 409, and operation 411 are omitted here. Detailed descriptions of operation 405, operation 407, operation 409, and operation 411 may be obtained by referencing the detailed descriptions for operation 305, operation 307, operation 309, and operation 311 in FIG. 3, respectively.

In addition, operation 415 in FIG. 4 may be the same as or correspond to operation 317 in FIG. 3, and operation 417 in FIG. 4 may be the same as or correspond to operation 319 in FIG. 3. Likewise, detailed descriptions of operation 415 and operation 417 may be obtained by referencing the detailed descriptions for operation 317 and operation 319, respectively.

In operation 409, the neighbor base station is determined as a fake base station because a cell allocation value in system information received from the neighbor base station does not satisfy a specified value (e.g., '0'). And thus, in operation 413, the communication circuit 110 may stop attempting the handover. In this case, the communication circuit 110 may maintain connection with the serving base station that currently connects with the electronic device 100.

According to various embodiments, a base station validity determining method of an electronic device may include receiving system information about at least one cell of a communication network from a base station and determining whether the base station is a valid component of the communication network based on one or more cell allocation values included in the system information.

According to various embodiments, the base station may be determined as an invalid fake base station, when the one or more cell allocation values satisfy a specified condition.

According to various embodiments, the base station may be determined as an invalid fake base station, when all cell allocation values included in the system information are '0'.

According to various embodiments, the method may further include storing information identifying the base station in a database in a memory, when the base station is determined as an invalid fake base station.

According to various embodiments, the method may further include transmitting the database to another base station that is determined as a valid component of the communication network.

According to various embodiments, the method may further include comparing system information about at least one cell of the communication network from another base station to information included in the database.

According to various embodiments, the method may further include verifying a cell allocation value in the system information from the other base station, based on the compared result.

According to various embodiments, the validity of the base station may be determined further based on a parameter value for cell selection and a parameter value for cell reselection in the system information.

According to various embodiments, the method may further include determining the base station as an invalid fake base station, when at least one of the parameter values is not less than a specified condition.

According to various embodiments, the method may further include maintaining connection with another base station that previously connected with the electronic device, when the base station is determined as being invalid.

According to various embodiments, security incident that occurs in the case where a user electronic device connects with an invalid fake base station may be prevented by determining validity of a base station to determine whether the user electronic device connects with the base station (or, a cell of the base station).

In addition, a database of a fake base station is provided to a valid base station, and thus the connection with a fake base station of another electronic device and the spread of security incident due to the connection may be prevented.

Besides, a variety of effects directly or indirectly understood through this disclosure may be provided.

Figure 5:
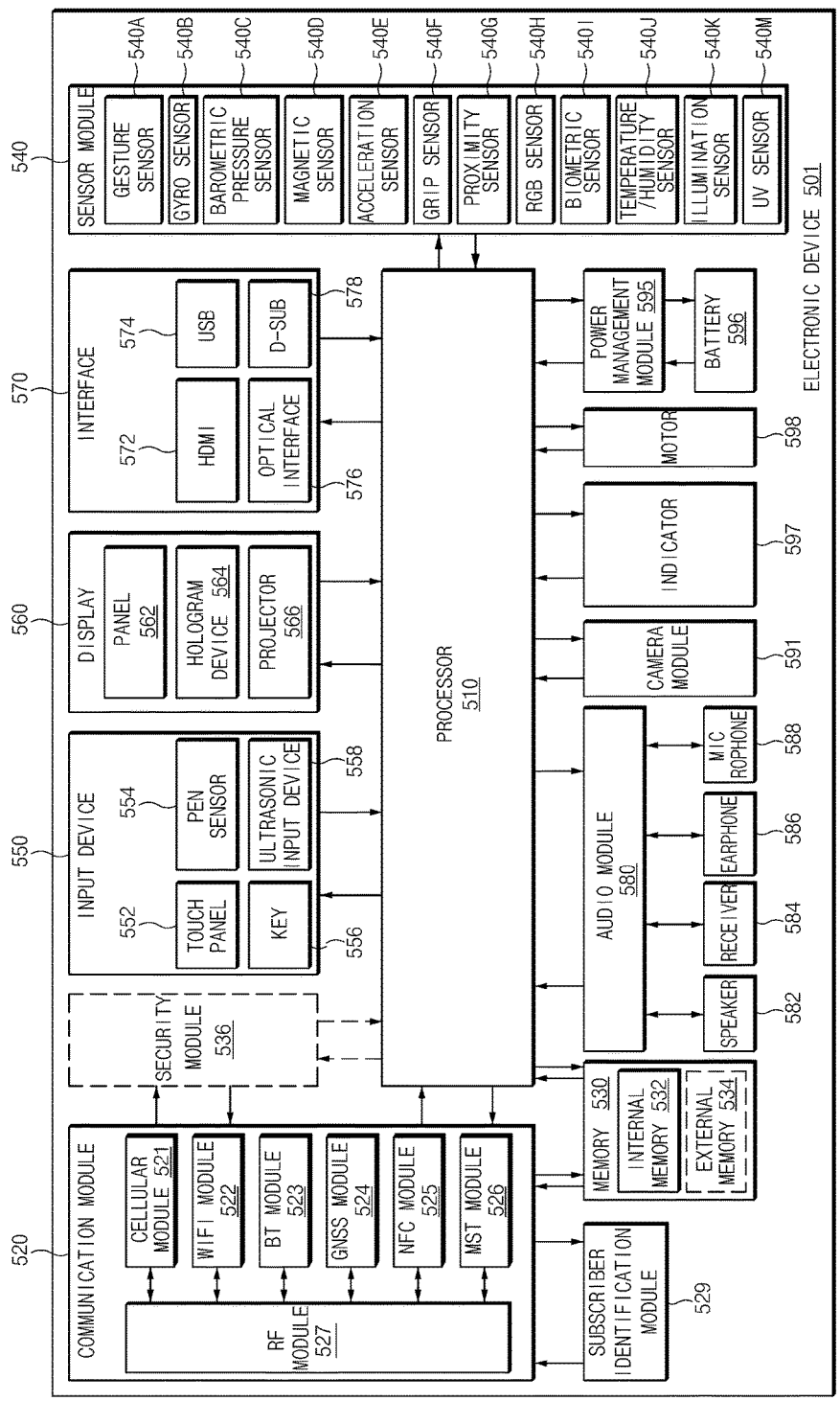
FIG. 5 illustrates a block diagram of an electronic device, according to an embodiment.

FIG. 5 illustrates a block diagram of an electronic device, according to an embodiment.

Referring to FIG. 5, the electronic device 501 may include, for example, all or part of an electronic device 100 shown in FIG. 2. The electronic device 501 may include one or more processors 510 (e.g., application processors (APs)), a communication module 520, a subscriber identification module (SIM) 529, a memory 530, a security module 536, a sensor module 540, an input device 550, a display 560, an interface 570, an audio module 580, a camera module 591, a power management module 595, a battery 596, an indicator 597, and a motor 598.

The processor 510 may drive, for example, an operating system (OS) or an application program to control a plurality of hardware or software components connected thereto and may process and compute a variety of data. The processor 510 may be implemented with, for example, a system on chip (SoC). According to an embodiment of the present disclosure, the processor 510 may include a graphic processing unit (GPU) (not shown) and/or an image signal processor (not shown). The processor 510 may include at least some (e.g., a cellular module 521) of the components shown in FIG. 5. The processor 510 may load a command or data received from at least one of other components (e.g., a non-volatile memory) into a volatile memory to process the data and may store various data in a non-volatile memory. The processor 510 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

The communication module 520 may have the same or similar configuration to the communication circuit 110 of FIG. 2. The communication module 520 may include, for example, the cellular module 521, a wireless-fidelity (Wi-Fi) module 522, a Bluetooth (BT) module 523, a global navigation satellite system (GNSS) module 524 (e.g., a GPS module, a Glonass module, a Beidou module, or a Galileo module), a near field communication (NFC) module 525, an MST module 526, and a radio frequency (RF) module 527.

The cellular module 521 may provide, for example, a voice call service, a video call service, a text message service, or an Internet service, and the like through a communication network. According to an embodiment of the present disclosure, the cellular module 521 may identify and authenticate the electronic device 501 in a communication network using the SIM 529 (e.g., a SIM card). According to an embodiment of the present disclosure, the cellular module 521 may perform at least part of functions which may be provided by the processor 510. According to an embodiment of the present disclosure, the cellular module 521 may include a communication processor (CP).

The Wi-Fi module 522, the BT module 523, the GNSS module 524, the NFC module 525, or the MST module 526 may include, for example, a processor for processing data transmitted and received through the corresponding module. According to various embodiments of the present disclosure, at least some (e.g., two or more) of the cellular module 521, the Wi-Fi module 522, the BT module 523, the GNSS module 524, the NFC module 525, or the MST module 526 may be included in one integrated chip (IC) or one IC package.

The RF module 527 may transmit and receive, for example, a communication signal (e.g., an RF signal). Though not shown, the RF module 527 may include, for example, a transceiver, a power amplifier module (PAM), a frequency filter, or a low noise amplifier (LNA), or an antenna, and the like. According to another embodiment of the present disclosure, at least one of the cellular module 521, the Wi-Fi module 522, the BT module 523, the GNSS module 524, the NFC module 525, or the MST module 526 may transmit and receive an RF signal through a separate RF module.

The SIM 529 may include, for example, a card which includes a SIM and/or an embedded SIM. The SIM 529 may include unique identification information (e.g., an integrated circuit card identifier (ICCID)) or subscriber information (e.g., an international mobile subscriber identity (IMSI)).

The memory 530 (e.g., a memory 120 of FIG. 2) may include, for example, an embedded memory 532 or an external memory 534. The embedded memory 532 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 534 may include a flash drive, for example, a compact flash (CF), a secure digital (SD), a micro-SD, a mini-SD, an extreme digital (xD), a multimedia car (MMC), or a memory stick, and the like. The external memory 534 may operatively and/or physically connect with the electronic device 501 through various interfaces.

The security module 536 may be a module which has a relatively higher secure level than the memory 530 and may be a circuit which stores secure data and guarantees a protected execution environment. The security module 536 may be implemented with a separate circuit and may include a separate processor. The security module 536 may include, for example, an embedded secure element (eSE) which is present in a removable smart chip or a removable SD card or is embedded in a fixed chip of the electronic device 501. Also, the security module 536 may be driven by an OS different from the OS of the electronic device 501. For example, the security module 536 may operate based on a java card open platform (JCOP) OS.

The sensor module 540 may measure, for example, a physical quantity or may detect an operation state of the electronic device 501, and may convert the measured or detected information to an electric signal. The sensor module 540 may include at least one of, for example, a gesture sensor 540A, a gyro sensor 540B, a barometric pressure sensor 540C, a magnetic sensor 540D, an acceleration sensor 540E, a grip sensor 540F, a proximity sensor 540G, a color sensor 540H (e.g., red, green, blue (RGB) sensor), a biometric sensor 540I, a temperature/humidity sensor 540J, an illumination sensor 540K, or an ultraviolet (UV) sensor 540M. Additionally or alternatively, the sensor module 540 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 540 may further include a control circuit for controlling at least one or more sensors included therein. According to various embodiments of the present disclosure, the electronic device 501 may further include a processor configured to control the sensor module 540, as part of the processor 510 or to be independent of the processor 510. While the processor 510 is in a sleep state, the electronic device 501 may control the sensor module 540.

The input device 550 may include, for example, a touch panel 552, a (digital) pen sensor 554, a key 556, or an ultrasonic input device 558. The touch panel 552 may use at least one of, for example, a capacitive type, a resistive type, an infrared type, or an ultrasonic type. Also, the touch panel 552 may further include a control circuit. The touch panel 552 may further include a tactile layer and may provide a tactile reaction to a user.

The (digital) pen sensor 554 may be, for example, part of the touch panel 552 or may include a separate sheet for recognition. The key 556 may include, for example, a physical button, an optical key, or a keypad. The ultrasonic input device 558 may allow the electronic device 501 to detect a sound wave using a microphone (e.g., a microphone 588) and to verify data through an input tool generating an ultrasonic signal.

The display 560 (e.g., a display 130 of FIG. 2) may include a panel 562, a hologram device 564, or a projector 566. The panel 562 may be implemented to be, for example, flexible, transparent, or wearable. The panel 562 and the touch panel 552 may be integrated into one module. The hologram device 564 may show a stereoscopic image in a space using interference of light. The projector 566 may project light onto a screen to display an image. The screen may be positioned, for example, inside or outside the electronic device 501. According to an embodiment of the present disclosure, the display 560 may further include a control circuit for controlling the panel 562, the hologram device 564, or the projector 566.

The interface 570 may include, for example, a high-definition multimedia interface (HDMI) 572, a universal serial bus (USB) 574, an optical interface 576, or a D-sub-miniature 578. Additionally or alternatively, the interface 570 may include, for example, a mobile high definition link (MHL) interface, an SD card/multimedia card (MMC) interface, or an infrared data association (IrDA) standard interface.

The audio module 580 may convert a sound and an electric signal in dual directions. At least part of components of the audio module 580 may be included in, for example, an input and output interface 140 (or a user interface) shown in FIG. 2. The audio module 580 may process sound information input or output through, for example, a speaker 582, a receiver 584, an earphone 586, or the microphone 588, and the like.

The camera module 591 may be a device which captures a still image and a moving image. According to an embodiment of the present disclosure, the camera module 591 may include one or more image sensors (not shown) (e.g., a front sensor or a rear sensor), a lens (not shown), an image signal processor (ISP) (not shown), or a flash (not shown) (e.g., an LED or a xenon lamp).

The power management module 595 may manage, for example, power of the electronic device 501. According to an embodiment of the present disclosure, though not shown, the power management module 595 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 596 and voltage, current, or temperature thereof while the battery 596 is charged. The battery 596 may include, for example, a rechargeable battery or a solar battery.

The indicator 597 may display a specific state of the electronic device 501 or part (e.g., the processor 510) thereof, for example, a booting state, a message state, or a charging state, and the like. The motor 598 may convert an electric signal into mechanical vibration and may generate vibration or a haptic effect, and the like. Though not shown, the electronic device 501 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a MediaFLO™ standard, and the like.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

What is claimed is:

1. An electronic device comprising:
a processor;
a memory; and
a communication circuit configured to receive system information about at least one cell of a communication network from a first base station;
wherein the processor is configured to:
determine whether the first base station is a valid component of the communication network based on a parameter value for cell selection and a parameter value for cell reselection, which are included in the system information,
when the first base station is determined as an invalid fake base station, store information identifying the first base station in a database in the memory and maintain connection with a second base station that previously connected with the electronic device, and
wherein the parameter value for cell selection and the parameter value for cell reselection indicate a priority of the first base station, the priority of the first base station indicating an order in which the first base station and other base stations connect to the electronic device.

2. The electronic device of claim 1, wherein the processor is further configured to:
determine the first base station as an invalid fake base station, when all cell allocation values included in the system information are '0'.

3. The electronic device of claim 1, wherein the processor is further configured to:
transmit the database to the second base station or a third base station that is determined as a valid component of the communication network.

4. The electronic device of claim 1, wherein the processor is further configured to:
determine whether system information about at least one cell of the communication network from another base station is same as information included in the database; and
verify a cell allocation value of the system information from the other base station, when the system information from the other base station is not included in the database.

5. The electronic device of claim 1, wherein the processor is further configured to:
determine the first base station as an invalid fake base station, when at least one of the parameter values is not less than a specified threshold value.

6. The electronic device of claim 1, wherein the processor is further configured to:
receive the system information about the at least one cell through a broadcasting channel (BCCH).

7. A base station validity determining method of an electronic device, the method comprising:
receiving system information about at least one cell of a communication network from a first base station;
determining whether the first base station is a valid component of the communication network based on a parameter value for cell selection and a parameter value for cell reselection, which are included in the system information;
when the first base station is determined as an invalid fake base station, storing information identifying the first base station in a database in a memory and maintaining connection with a second base station that previously connected with the electronic device; and
wherein the parameter value for cell selection and the parameter value for cell reselection indicate a priority of the first base station, the priority of the first base station indicating an order in which the first base station and other base stations connect to the electronic device.

8. The method of claim 7, wherein the first base station is determined as an invalid fake base station, when all cell allocation values included in the system information are '0'.

9. The method of claim 7, further comprising:
transmitting the database to the second base station or a third base station that is determined as a valid component of the communication network.

10. The method of claim 7, further comprising:
comparing system information about at least one cell of the communication network from another base station to information included in the database; and
verifying a cell allocation value in the system information from the other base station, based on the compared result.

11. The method of claim 7, further comprising:
determining the first base station as an invalid fake base station, when at least one of the parameter values is not less than a specified condition.

12. A non-transitory computer-readable recording medium of an electronic device storing embodied thereon instructions, the instructions for, when executed by at least one processor, causing the at least one processor to:
receive system information about at least one cell of a communication network from a first base station;
determine whether the first base station is a valid component of the communication network based on a parameter value for cell selection and a parameter value for cell reselection, which are included in the system information;
when the first base station is determined as an invalid fake base station, store information identifying the first base station in a database in a memory and maintain connection with a second base station that previously connected with the electronic device; and
wherein the parameter value for cell selection and the parameter value for cell reselection indicate a priority of the first base station, the priority of the first base station indicating an order in which the first base station and other base stations connect to the electronic device.

* * * * *